No. 720,628. PATENTED FEB. 17, 1903.
A. L. SHAW.
MACHINE FOR SAWING, BEVELING, AND CHAMFERING WOOD.
APPLICATION FILED APR. 2, 1902.
NO MODEL. 3 SHEETS—SHEET 1.
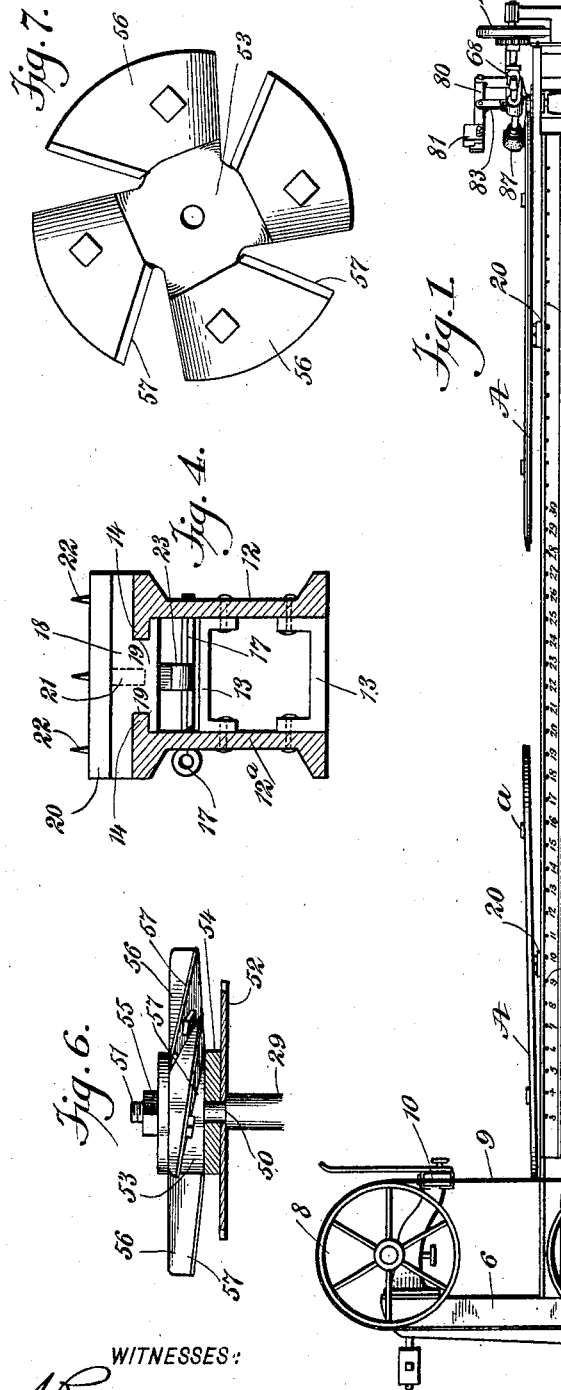
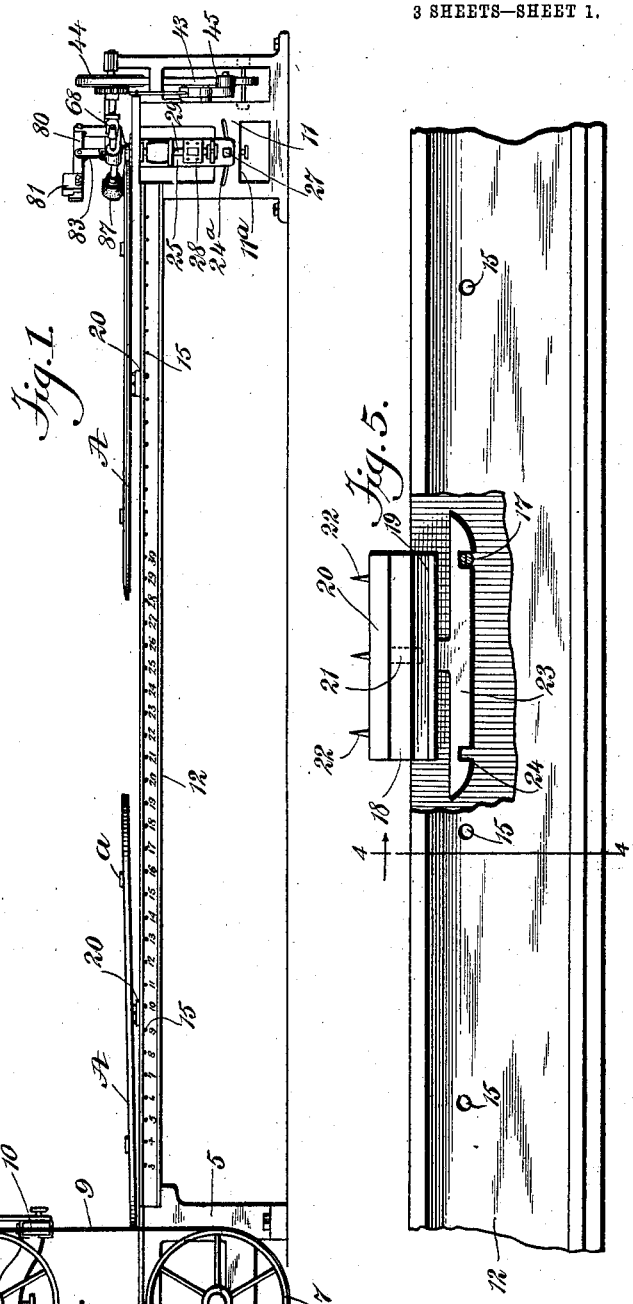
WITNESSES:
INVENTOR
Albert L. Shaw
BY
ATTORNEYS No. 720,628. PATENTED FEB. 17, 1903.
A. L. SHAW.
MACHINE FOR SAWING, BEVELING, AND CHAMFERING WOOD.
APPLICATION FILED APR. 2, 1902.
NO MODEL. 3 SHEETS—SHEET 2.
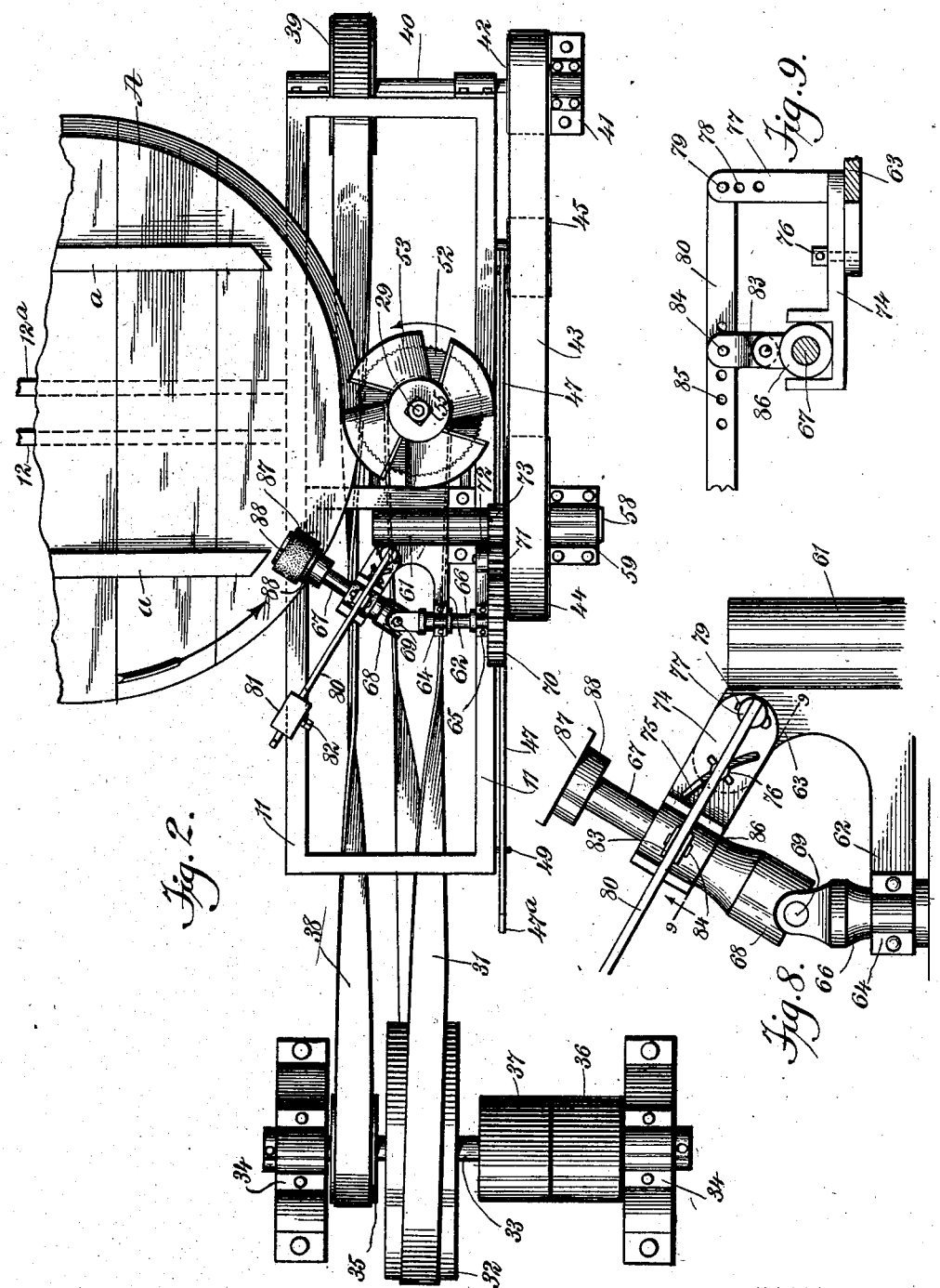
WITNESSES:
INVENTOR
Albert L. Shaw
BY
ATTORNEYS No. 720,628. PATENTED FEB. 17, 1903.
A. L. SHAW.
MACHINE FOR SAWING, BEVELING, AND CHAMFERING WOOD.
APPLICATION FILED APR. 2, 1902.
NO MODEL. 3 SHEETS—SHEET 3.
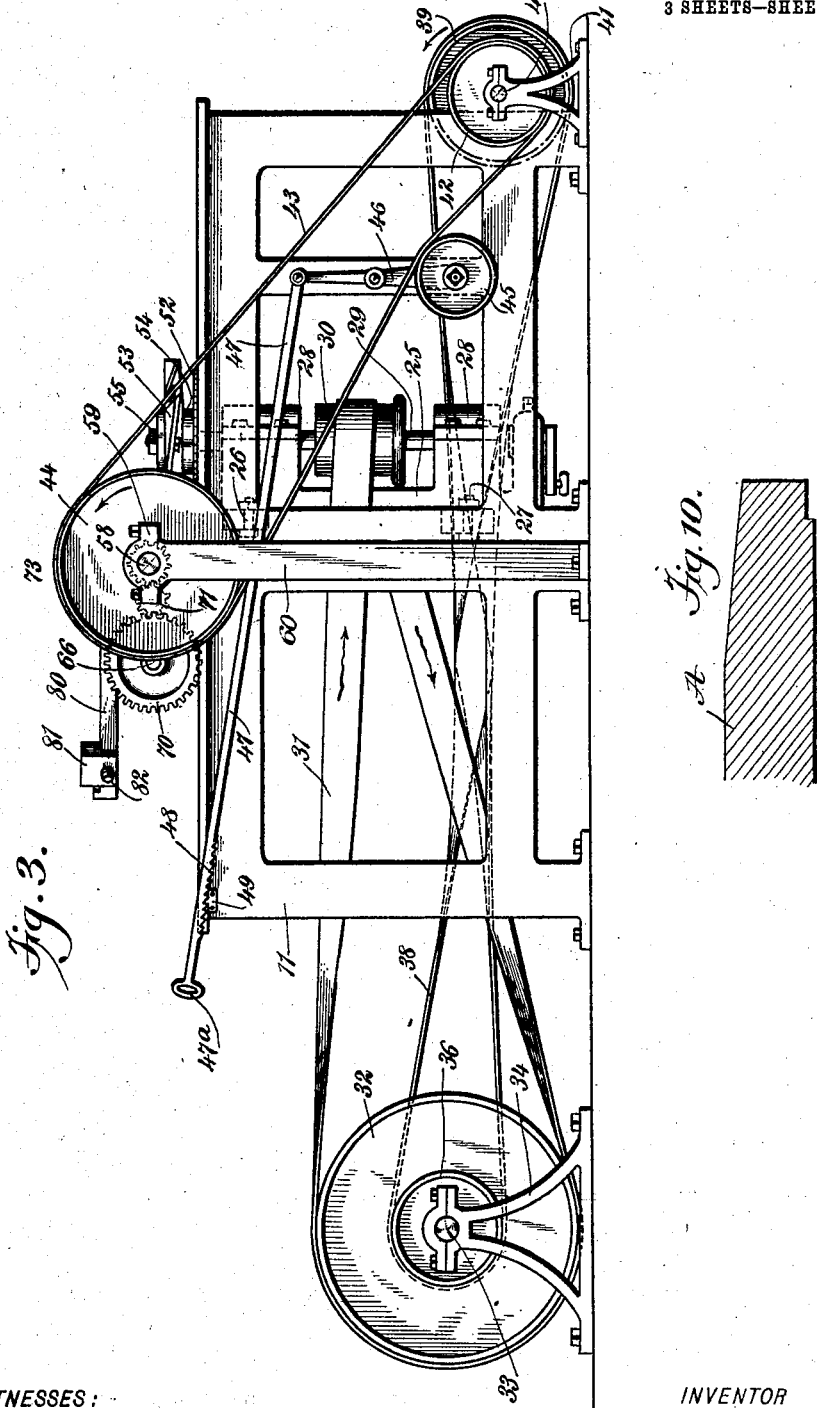
WITNESSES:
INVENTOR
Albert L. Shaw
BY
ATTORNEYS

UNITED STATES PATENT OFFICE.

ALBERT LAWRENCE SHAW, OF WHITECASTLE, LOUISIANA, ASSIGNOR OF SIXTY ONE-HUNDREDTHS TO ROBERT H. DOWNMAN, OF NEW ORLEANS, LOUISIANA.

MACHINE FOR SAWING, BEVELING, AND CHAMFERING WOOD.

SPECIFICATION forming part of Letters Patent No. 720,628, dated February 17, 1903.

Application filed April 2, 1902. Serial No. 101,057. (No model.)

*To all whom it may concern:*

Be it known that I, ALBERT LAWRENCE SHAW, a citizen of the United States, residing at Whitecastle, in the parish of Iberville and State of Louisiana, have invented certain new and useful Improvements in Machines for Sawing, Beveling, and Chamfering Wood, of which the following is a full, clear, and exact description.

My invention relates to a machine for sawing, beveling, and chamfering wood, especially adapted for the manufacture of bottoms for cisterns, vats, tanks, and stills, although it will be understood that my machine or some of the parts thereof may be used for the performance of useful work in other relations.

Among other things my invention has for its object the provision of means by which a wooden bottom formed of connected staves may be cut to a circular form and of any desired diameter within certain limits; to provide means for bringing the work from the sawing mechanism to a rotary dressing-tool (which combines a cutter and a circular saw) without changing the work from its carrier or removing the work from the machine; to provide an improved form of rotary dressing-tool adapted to cut a bevel and form a chamfer on the work at one operation, such dressing of the work leaving it in a smooth neat condition as distinguished from the rough finish given to the work by prior devices known to me; to so construct the rotary dressing-tool that it may be adapted to properly operate on pieces of work which vary in thickness; to provide power-driven means for feeding the work steadily and uniformly to the rotary dressing-tool; to make the feeding mechanism adaptable to work which varies in diameter, and to simplify and improve the machine in its various parts, so as to increase the efficiency of the machine as a whole and to enable said machine to be manufactured at a moderate cost.

With these ends in view the invention consists in the novel combinations of mechanisms and in the construction, arrangement, and adaptation of parts, as will be hereinafter fully described. The actual scope of the invention will be defined by the claims.

Reference is to be had to the accompanying drawings, forming a part of this specification, in which similar characters of reference indicate corresponding parts in all the figures.

Figure 1 is a side elevation of a combined sawing, beveling, and chamfering machine embodying my invention. Fig. 2 is an enlarged plan view of the right-hand portion of the machine, illustrating the mechanism for beveling and chamfering wood for use in the manufacture of the bottoms of receptacles of various kinds. Fig. 3 is a side elevation of the devices shown by Fig. 2. Fig. 4 is a transverse sectional view through the guides and the adjustable work-carriers, the plane of the section being indicated by the dotted line 4 4 of Fig. 5. Fig. 5 is a side view, partly broken away, illustrating the adjustable work-carrier and the guides for supporting the same and the means for locking the work-carrier in different positions. Fig. 6 is an enlarged detail view through a rotary dressing-tool for producing the bevel and chamfer on the work. Fig. 7 is an enlarged detail view of the cutter-head forming one part of the rotary dressing-tool. Fig. 8 is a detail side elevation showing the means for adjusting the feed mechanism to adapt the latter for operation on pieces of work which vary in diameter. Fig. 9 is a section on the line 9 9 in Fig. 8, and Fig. 10 is a detail view of part of the finished work.

The work is cut to a circular condition of any desired diameter within certain limits by a sawing mechanism located at the left-hand end of the machine. (Shown by Fig. 1.) This sawing mechanism is of the endless or band-saw type, and, as shown by Fig. 1, it comprises a suitable bench 5, having an upstanding frame 6, and on this bench and frame are journaled the shafts for the driving and idle pulleys 7 8, adapted for the operation of a band-saw 9, which travels through a guide 10. It will be understood that I do not desire to limit myself to any particular type of sawing mechanism, and I do not, therefore, consider it expedient to more fully describe the sawing mechanism herein disclosed. At the opposite or right-hand end of the machine I have provided a framework or bench 11, adapted for the support of the rotary dressing-tool, the means for driving the same, and the several parts which coact therewith, all to be hereinafter more fully described.

Between the bench 5 and the framework 11 are arranged the parallel beams 12 12ª, (see Figs. 1, 4, and 5,) said beams being supported by the bench and the framework and forming the guideway for the shiftable work-carriers. These beams are arranged in horizontal positions parallel to one another, and they are braced at suitable intervals by the employment of the internal stays 13, which may be of any suitable construction and fastened to the beams by any approved means. Said beams are provided at their upper edges with the inwardly-extending flanges 14, and the beams are furthermore provided with the series of pin-receiving apertures 15, the latter being spaced apart at any suitable intervals and adapted to receive the locking-pins 17. (See Figs. 4 and 5.)

The guideway formed by the beams between the sawing and dressing mechanisms is adapted to receive one or more shiftable work-carriers, two of which are shown operatively applied to the guideway by Fig. 1. Each work-carrier comprises a base member 18, which is provided in its side edges with the grooves 19, adapted for the reception of the flanges 14 on the beams of the guideway, whereby this base member of the work-carrier is slidably fitted to the guideway for adjustment longitudinally on the latter. The shiftable member of the work-carrier is in the form of a bed-plate 20, which is fitted flat upon the base member 18, so as to rest solidly and squarely thereon, and this shiftable member 20 is pivotally connected to the base member 18—as, for example, by the central stud or gudgeon 21. (Indicated by dotted lines in Figs. 4 and 5.) The shiftable member of the work-carrier has its active face provided with any suitable means for engaging and retaining the work on said carrier; but, as shown by Figs. 4 and 5, this work-retaining means is in the form of a plurality of pins or studs 22, which may be embedded in the work that is placed upon the carrier. The work-carrier and the work thereon are intended to be adjusted along the guideway to different positions with respect to the sawing mechanism and the dressing mechanism, and after the carriage shall have been placed in its proper position it should be locked or fastened securely in place by suitable means in order to prevent displacement of the carrier and the work relative to the sawing or dressing mechanisms when the necessary operations are being performed on the work. This carrier-locking mechanism may be of any suitable type; but as shown the base member 18 of the carrier is provided with a locking-bar 23, which is made fast to said base member, so as to depend therefrom and lie between the beams 12 12ª of the guideway. This locking-bar is provided with one or more apertures or notches 24, in one or both of which may be placed the proper number of locking-pins 17, the latter adapted to be received in the openings 15 and to be shifted from one opening to the other, according to the distance of the work-carrier from the sawing or dressing mechanism.

The framework 11 extends substantially at right angles to the guideway 12 12ª, and the cross-bar 11ª of this framework is provided with an arcuate slot 24ª. (See Fig. 1.) Against this slotted part of the framework is applied an adjustable cutter-frame 25, the latter being disposed in an upright or vertical position against one end portion of said frame, as shown by Fig. 1. This cutter-frome 25 is connected pivotally to the framework 11 by means of a suitable bolt, (indicated by dotted lines at 26 in Fig. 3,) and the lower portion of this cutter-frame overlaps the slotted bar 11ª of the framework in order that a shiftable clamping-bolt 27 may pass through the arcuate slot 24, thus making provision for adjusting the cutter-frame to different angular positions and for clamping said cutter-frame securely in its adjusted positions. The cutter-frame 25 is provided with vertically-alined shaft-bearings 28, the latter receiving a cutter-shaft 29, which is thus mounted for free rotation in the cutter-frame and is adapted to partake of the angular adjustments thereof. This cutter-shaft is provided at a point intermediate of its length with a driving-pulley 30, around which passes an endless belt 31, which is driven from a pulley 32 on a main shaft 33, the latter finding bearings in the pillar-blocks 34. This shaft 33 is furthermore provided with a small pulley 35 and with the fast and loose pulleys 36 37, said small pulley 35 driving a crossed belt 38, which extends to and around a pulley 39 on a counter-shaft 40, the latter being mounted in suitable pillar-blocks 41. Said shaft 40 is provided with a pulley 42, adapted to propel an endless belt 43, which extends in an upwardly-inclined direction to a pulley 44 on the non-shiftable member of a tumbling-shaft, to be hereinafter described. The said belt 43 has a permanent allowance of abundant slack, so that it may run idly over the pulley 44 when it is not desired to drive the tumbling-shaft, which, it should be explained, propels the feed mechanism for the rotary dressing-tool; but when it is desired to bring this feed mechanism into service this slack in the belt 43 is taken up by the adjustment of a tightener-pulley 45, which is mounted on a lever 46, having pivotal connection with a shipper-rod 47, the latter extending in an inclined direction and toward the upper portion of the framework 11. This shipper-rod is provided with a handle 47ª and with a series of teeth 48, adapted to engage with a suitable detaining device 49, which is attached to the framework 11, as shown by Fig. 3.

I will now proceed to describe one form of the rotary dressing-tool adapted to be carried by the cutter-shaft 29, the latter extending a suitable distance above the topmost bearing 28 of the cutter-frame 25. This cutter-shaft is provided with an annular shoulder 50 and with a threaded upper extremity 51, that portion of the shaft between the shoulder and the thread being smooth, as shown by Fig. 6. One member of the rotary dressing-tool is a circular saw 52, which is adapted to be slipped on the shaft 49 and to rest upon the shoulder 50 thereof, said saw being quite thin and adapted to form a recess in one face of the wood. The other member of the rotary dressing-tool is the cutter-head 53, and between the saw 52 and the cutter-head 53 may be interposed any one of a series of collars or sleeves 54, according to the different thicknesses of the work which it is desired to have operated upon by the rotary dressing-tool. The collar 54 is slipped on the shaft so as to rest upon the saw 52, and then the head 53 is fitted on the shaft to rest upon the collar 54, after which a clamping-nut 55 is screwed on the threaded end 51 of said shaft in order to clamp or firmly secure the saw and the cutter-head to the cutter-shaft. The cutter-head is provided with a series of outstanding wings 56, which support a corresponding number of knives or blades 57, and one peculiar feature of my cutter-head consists in arranging these wings and the knives so that the latter will operate on the work with a draw or shear cut. The wings and the knives are disposed in positions oblique to the vertical axis of the cutter-head, and these knives are disposed to act successively on the work during the rotation of the head. By arranging the blades or knives in the oblique positions, so that they will operate with a draw or shear cut, the cutter-head is adapted to impart the desired bevel to the work in a manner to leave it in a smooth finished condition. The cutter-head occupies a spaced relation to the saw in order that the knives 57 may operate on one face of the work while the circular saw 52 cuts the recess in the other face of the work, and thus the bevel and the recess are produced in the work at one operation by the rotary dressing-tool. The angle or inclination of the bevel may be varied by adjusting the cutter-frame 25 and the cutter-shaft 29 to different positions from the axis afforded by the pivotal bolt 26. It is evident that the nut 55 may be unscrewed from the cutter-shaft for the purpose of withdrawing the cutter-head, the sleeve, or the saw, thus enabling said parts to be interchanged with other parts of like construction and permitting sleeves or collars 54 of different lengths to be placed between the saw and the cutter-head, according to the desired thickness of the work.

I will now proceed to describe the power-driven feed devices by which the work may be uniformly and steadily advanced to the rotary dressing-tool, reference being had more particularly to Figs. 2, 3, 8, and 9 of the drawings. The pulley 44 is made fast with a feed driving-shaft 58, the latter being arranged in a horizontal position on or above the framework 11. One end portion of this shaft is journaled in a bearing 59 of a standard 60, and the other portion of said shaft is in a bearing 61 on the framework, the said bearing 61 having the laterally-extending arms 62 63. The arm 62 is provided with a shaft-bearing 64, which is disposed in alinement with another shaft-bearing 65, that is made fast with the framework 11, and in these alined bearings 64 65 is journaled the non-shiftable member 66 of a tumbling-shaft, the shiftable member of which tumbling-shaft is indicated at 67. The two members 66 67 of the tumbling-shaft are united flexibly together by means of a knuckle or universal joint 68, the pivot of which is indicated at 69, whereby the member 67 of said shaft may be adjusted to different positions relative to the member 66, and at the same time said member 67 may be propelled or driven from the member 66. This non-shiftable member 66 of the tumbling-shaft is provided with a spur-gear 70, having intermeshing engagement with an intermediate idler-gear 71, the shaft of which is journaled in a suitable short post 72 on the framework 11. The intermediate idler-gear is driven from a gear 73, which is secured fast with the feed driving-shaft 58 at a point adjacent to its pulley 44, and thus the motion transmitted by the belt 43 serves to impel the shaft 58, the train of gears, and the two-part tumbling-shaft. 74 indicates an adjustable plate which is fitted upon the arm 63 of the bearing 61, and this adjustable plate is provided with an arcuate slot 75, the latter being struck from a center afforded by the pivotal connection 69 between the members of the tumbling-shaft. Through this slot passes a clamping-bolt 76, which is attached to the arm 63, thus making provision for the adjustment of the plate 74 to different radial positions from the center afforded by the pivot 69. This adjustable plate 74 is provided with an upstanding post 77, which is made fast with the plate, so as to be adjustable therewith. The post is provided with a vertical series of apertures 78, adapted to receive the fulcrum-bolt 79 for a pressure and adjusting lever 80, the latter being thus adjustably connected to the post, so as to be raised or lowered thereon and to be shiftable with the plate 74. This lever 80 occupies a substantially horizontal position over the framework of the machine, and its free end is arranged to receive a pressure-weight 81, which may be clamped adjustably to the lever by a set-screw 82 or any suitable fastening means. A hanger 83 is adjustably connected to the lever by means of a pin 84, the latter adapted to be placed in either one of a series of apertures 85, which are provided in the lever between its fulcrum 79 and the shiftable pressure-weight 81. This hanger is provided at its lower end with a sleeve or bearing 86, in which is journaled the shiftable member 67 of the tumbling-shaft, whereby the latter is adapted to be suspended partly by the hanger and from the pressure-lever. The member 67 of the tumbling-shaft passes through the bearing 86, and at its free end opposite to the universal joint 68 said shaft member 67 is provided with a yieldable pressure-roll 87, the latter arranged in a position to overhang the path of the work (indicated at A) and to be pressed forcibly thereon by the weighted lever 80. This roll is made of rubber or other suitable material, which will afford good frictional engagement with the work, and I prefer to place the rubber roll between suitable flanges 88, which are provided on the shaft member 67. It will be observed that the slotted plate 74 and the lever 80 may be adjusted to different positions on the arm 63 and within a radius permitted by the slot 75, whereby the angular position of the shaft member 67 to the shaft member 66 may be changed in order to bring the friction feed-roller 87 into different positions, thus adapting the friction feed mechanism to successfully operate on different pieces of work that vary in diameter.

Before placing the work in the machine a number of strips are doweled together, so as to lie in the same plane and are united temporarily by suitable transverse battens, as indicated at $a$, thus producing a wide board A, which may be operated upon by the sawing and dressing mechanisms for the rapid and economical production of bottoms for tanks, cisterns, vats, stills, and other receptacles. After fastening a number of strips together the work A is placed on the member 20 of the carrier, and this carrier is adjusted along the guideway until it reaches a proper position relative to the sawing mechanism, at which time one or more pins 17 are passed through proper openings 15 in the guide-beams, so as to engage with one or more notches in the locking-bar 23, thereby holding the member 18 of the carrier in a locked position. The band-saw 9 having been set in operation, the operator turns the work A by hand in order to enable the saw to cut the work to a circular condition, the work turning with the shiftable rotary member 20 of the work-carrier on the axis afforded by the pintle or gudgeon 21. After having subjected the work to the sawing operation and reduced the work to a circular condition the pin or pins 17 are withdrawn, and the carriage, with the work resting thereon, is moved endwise along the guideway until said carriage reaches a proper position at or near the opposite end of the guideway, so as to properly present the work to the rotary dressing-tool. Said carriage, with the circular work thereon, is locked in place by the reinsertion of the pin or pins 17 in the proper aperture or apertures of the guideway. The operator adjusts the cutter-frame 25 to the proper position, and the adjustable plate 74 is shifted in order to bring the friction feed-roll 88 into engagement with the upper face of the work, as shown by Fig. 2. The dressing-tool is now driven and the feed-roll 87 is propelled by their respective driving connections with the shafts 33 40, and the work on the shiftable member of the carrier is caused to turn in the direction indicated by the arrow in Fig. 2, thereby feeding the work positively to the rotary dressing-tool. The cutter frame and shaft having been given the proper inclination and the work being fed to the tool in the manner described, the blades of the cutter-head are made to operate upon the top face of the work, so as to give the desired bevel thereto, as shown by Fig. 10, and at the same time the saw is caused to operate on the under or bottom face of the work in order to form the recess therein, as also shown by Fig. 10. It is evident that the feed-roll 87 will be held in frictional engagement with the work by the action of the weighted lever, and this lever may be raised in order to withdraw the feed-roll from the path of the work when it is desired to adjust said work to the dressing mechanism and to remove the work from said dressing mechanism.

Having thus described my invention, I claim as new and desire to secure by Letters Patent—

1. A machine of the class described, comprising a sawing mechanism, a dressing mechanism, a horizontal guideway between said mechanisms, a work-carrier having a slidable member fitted in said guideway and a horizontal member supported on the slidable member above the guideway and free to turn on a vertical axis with relation to either the sawing mechanism or the dressing mechanism, and means for locking the slidable carrier member in a fixed position in the guideway.

2. A machine of the class described, comprising a horizontal guideway, a band-sawing mechanism at one end of said guideway, a dressing mechanism at the other end of the guideway, a work-carrier having a slidable member fitted to the guideway and limited thereby to adjustment in a rectilinear path between the two mechanisms, said work-carrier also having a horizontal revoluble member which is mounted on the slidable member and supported thereby above the guideway and is free to turn on a vertical axis when presented either to the sawing mechanism or to the dressing mechanism, and a locking device engaging with the slidable carrier member and the guideway to hold one member of the carrier in a fixed position.

3. A machine of the class described, comprising a horizontal perforated guideway, a slidable carrier member fitted therein, a perforated locking-bar fast with said carrier member and disposed within the guideway, an insertible locking-pin engaging with the guideway and the carrier member, a revoluble horizontal carrier member mounted on the slidable carrier and free to turn on a vertical axis in a plane above the guideway, a saw mechanism at one end of the guideway, and a dressing mechanism at the other end of the way, whereby work on the carrier may be presented and rotated relatively to either mechanism.

4. In a machine of the class described, the combination with a revoluble work-carrier, and a dressing-tool, of a pivoted supporting-plate, means for holding said plate in different angular positions, a pressure-lever fulcrumed on said plate and adjustable therewith, a bearing carried by said lever, a stationary bearing, a tumbling-shaft having one member mounted in the bearing of said lever and another member journaled in the stationary bearing, and a feed-roll on the shaft member carried by the lever.

5. A machine of the class described, comprising a horizontal revoluble work-carrier mounted to turn freely on a vertical axis, a revoluble dressing-tool having a beveling-cutter and a kerf-cutting saw lying in a plane at right angles to the axis of said cutter and spaced with relation thereto, said work-carrier being operable to present the work edgewise relative to the dressing-tool which at one operation saws a kerf at one face of the work and bevels the latter adjacent to the kerf, and a feed mechanism for rotating the work relative to the dressing-tool, the axes of rotation of the cutter and the work-carrier being substantially parallel.

6. A machine of the class described having an upright cutter-frame adjustable to different angular positions, a cutter-shaft arranged longitudinally in said frame, a dressing-tool attached to said shaft and having a cutter-head and a saw disposed in spaced relation to each other, a horizontal revoluble work-carrier in coöperative relation to the dressing-tool and free to turn on a vertical axis to present the edge of the work to said tool, and a feed mechanism engaging frictionally with the work to rotate the latter and the carrier in a horizontal plane.

7. A machine of the class described having a horizontal revoluble work-carrier, a dressing-tool adjacent thereto and mounted to turn on a vertical axis, means for adjusting said work-carrier back and forth with relation to said dressing-tool, a tumbling-shaft having a friction feed-roll adapted to engage with work on said carrier, supporting means for adjusting the shiftable member of said tumbling-shaft to different positions relative to said work-carrier, and a pressure device mounted on said supporting means and connected to said shiftable shaft member.

8. A machine of the class described having a shiftable work-carrier, a dressing-tool, a tumbling-shaft, a friction-roll carried by the shiftable member of the tumbling-shaft, adjustable supporting means carrying said shiftable shaft member and adapted to change the position of said member and of the feed-roll with relation to the dressing-tool, and pressure devices mounted on the supporting means and connected to the shiftable shaft member to hold the feed-roll frictionally in engagement with work on said carrier.

9. A machine of the class described, having a shiftable work-carrier, a dressing-tool, a tumbling-shaft having one member thereof mounted in stationary bearings, means for driving the non-shiftable member of the tumbling-shaft, a supporting-plate adjustable to different angular positions from the axis of the pivotal connection between the members of said tumbling-shaft, a pressure-lever mounted on said adjustable plate, a hanger supporting the shiftable member of the tumbling-shaft and attached to said lever, and a feed-roll mounted on the shiftable shaft member.

In testimony whereof I have signed my name to this specification in the presence of two subscribing witnesses.

ALBERT LAWRENCE SHAW.

Witnesses:
R. B. SPOFFORD,
W. F. BROWN.